United States Patent [19]

Graverholt

[11] Patent Number: 4,991,983
[45] Date of Patent: Feb. 12, 1991

[54] MICR ENCODER

[75] Inventor: James M. Graverholt, Woodinville, Wash.

[73] Assignee: Global Technology International, Inc., Mukiteo, Wash.

[21] Appl. No.: 242,709

[22] Filed: Sep. 9, 1988

[51] Int. Cl.⁵ .............................................. B41J 5/00
[52] U.S. Cl. ................................. 400/105; 400/625; 400/642; 400/708; 271/265; 101/233
[58] Field of Search ........................ 101/232–235; 400/624, 625, 642, 248; 271/265, 270

[56] References Cited

U.S. PATENT DOCUMENTS

| | | | |
|---|---|---|---|
| 4,211,397 | 7/1980 | Hansen et al. | 271/270 |
| 4,423,971 | 1/1984 | Hira et al. | 400/536 |
| 4,453,667 | 6/1984 | Zerfahs | 271/270 |
| 4,522,385 | 6/1985 | Stefansson | 271/270 |
| 4,624,588 | 11/1986 | Bivin | 400/105 |
| 4,632,376 | 12/1986 | Dubois | 271/270 |
| 4,688,785 | 8/1987 | Nubson et al. | 271/270 |
| 4,696,592 | 9/1987 | Oka et al. | 400/642 |
| 4,712,935 | 12/1987 | LaDue et al. | 400/247 |
| 4,818,126 | 4/1989 | Brooks et al. | 400/120 |

Primary Examiner—Eugene H. Eickholt
Attorney, Agent, or Firm—Graybeal, Jensen & Puntigam

[57] ABSTRACT

An electronic, programmable check encoder (10) having a check guide (14) capable of receiving a check to be encoded. A plurality of sensors (40,42,44,46) locate the position of the check in the check guide (14). Following determination of the position of the check, the check is clamped and moved by a drive assembly to an encoder (80) and then moved out of the apparatus by an eject assembly. the structure and interrelationship of the check gudie (14), the sensors (40,42,44,46) the check drive assembly and the check eject assembly are such that the check processing speed is significantly increased.

8 Claims, 3 Drawing Sheets

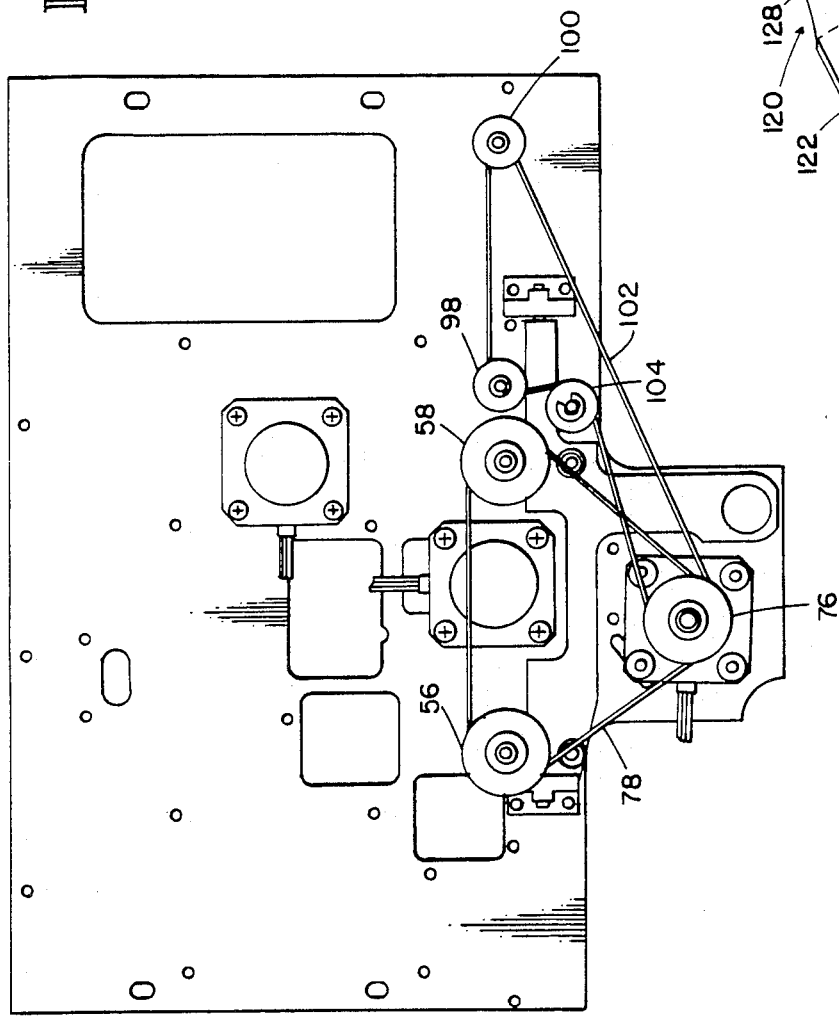
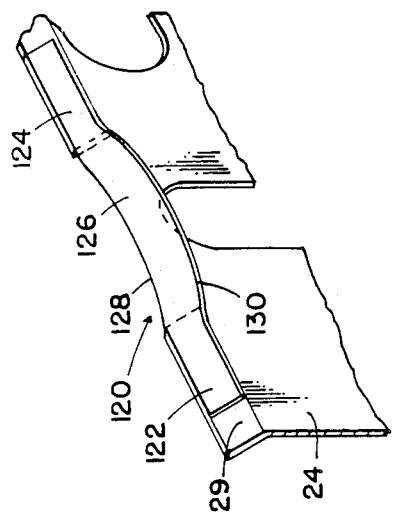

MICR ENCODER

DESCRIPTION

1. Technical Field

This invention relates generally to the art of check encoders and more specifically concerns a portable MICR (magnetic ink character recognition) check encoder capable of relatively high speed operation.

2. Background Art

Until relatively recently, encoding of checks and other documents with MICR code has been accomplished with mechanical and electromechanical devices. Typically, these machines were quite large, bulky, and difficult to operate. The procedure for changing the information to be encoded on a check was tedious and typically quite time consuming. Hence, such devices were not considered to be very flexible in operation. One of the very first commercial electronic MICR check encoders having a programmable capability is the subject of U.S. Pat. No. 4,624,588 to Bivin. The machine described therein has achieved commercial success and in fact is still being produced and sold, albeit with some modifications.

Since the commercial introduction of that particular encoder, however, other encoders with similar electronic and programming capability have been introduced which are competitive with that encoder. Even though such machines generally have achieved a substantial degree of commercial success, it is desirable to substantially increase the throughput of the check, i.e. the speed at which a check is processed by the machine. Significant increases in speed of operation have heretofore not been possible, due to the difficulty of increasing paper speed with existing paper transport systems used in present encoders, such as the '588 encoder. Increases in paper speed with such systems result in a substantial increase in the number of paper jams in the check guide, flapping of the paper during transport, which results in poor printing quality, and misalignment of the paper during transport, again resulting in poor printing quality and character placement errors. These factors and others have prevented substantial increases in paper processing speed.

Accordingly, applicants have originated a MICR check encoder having a paper transport system which is capable of check processing speeds which are almost twice that of existing systems.

DISCLOSURE OF THE INVENTION

Accordingly, the present invention is a portable check encoding apparatus which includes a guide means which is capable of receiving a check or other document to be encoded, means for detecting when the check is correctly positioned in the check guide, including first and second spaced apart sensors and means for detecting the leading edge of the check. Further, the apparatus includes means for selectively clamping the check and for thereafter moving the check along the check guide, as well as means for encoding the check with selected data. Also included is a means for ejecting the check from the check guide, the eject means being located downstream of the encoder means and including means for gripping and moving the check. The eject means is operative relative to the check during the time that the check is clamped by the check clamping and moving means; however, the action of the eject means is insufficient to overcome the control of the movement of the check and the gripping action exercised by the check clamping and moving means when the check clamping and moving means is itself operative on the check. Still further, the apparatus includes means for releasing the clamping means, which permits the eject means to move the check out of said guide means and said apparatus.

BRIEF DESCRIPTION OF THE DRAWINGS

FIG. 5 is a bottom view of a portion of the structure of the apparatus of FIG. 1, showing the drive system for the paper transport system of FIG. 3.

FIG. 6 is an isometric view showing the check deflector portion of the paper transport system of FIG. 3.

BEST MODE FOR CARRYING OUT THE INVENTION

Figure 1:
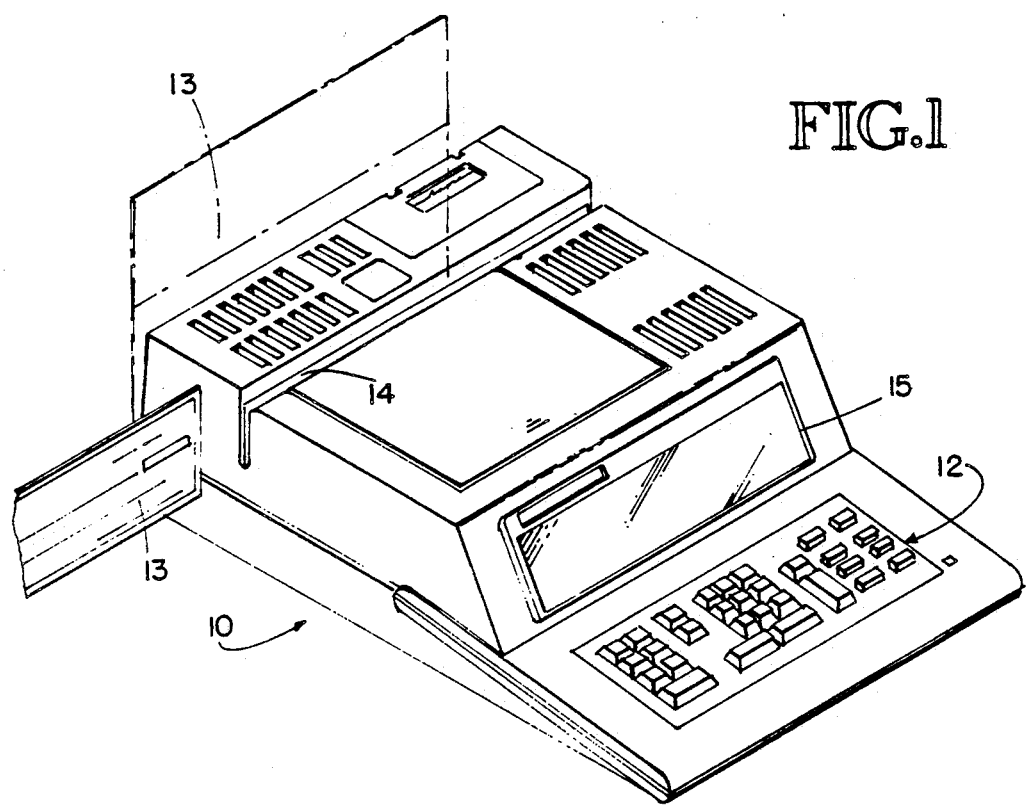
FIG. 1 is an isometric view of the apparatus of the present invention.
Figure 2:
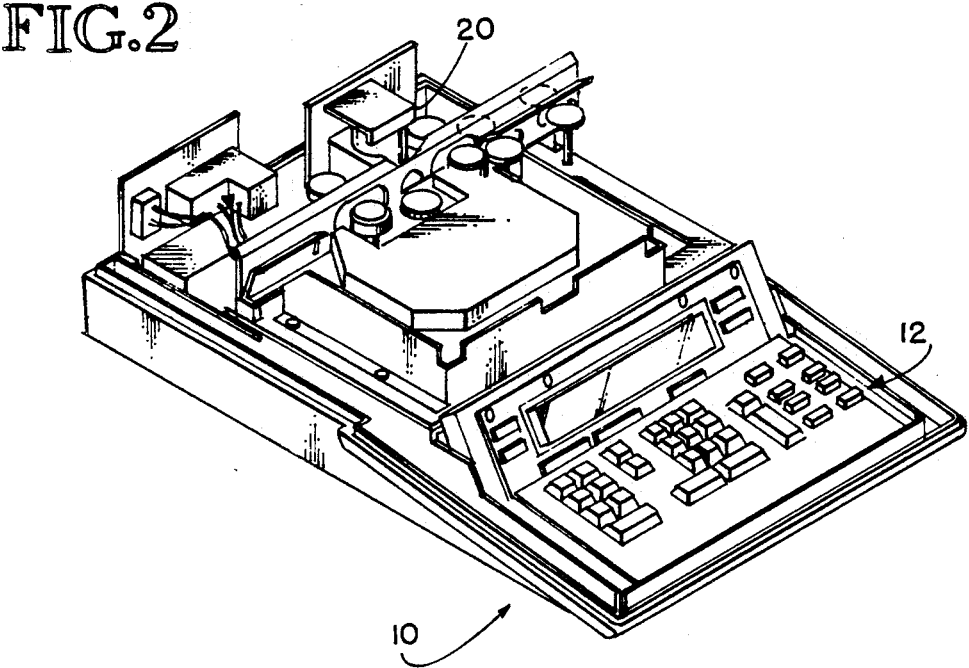
FIG. 2 is an isometric view of the apparatus of FIG. 1 with the exterior portion removed.

FIG. 1 shows the exterior of the improved MICR encoder of the present invention, referred to generally at 10. The encoder 10 is generally defined as a programmable, electronic check encoder. The information which is to be encoded on a check is conveniently controlled by an operator simply through a keyboard interface which is shown at 12. The actual operation of the apparatus is controlled by a microprocessor in response to information and commands entered by the operator through the keyboard 12. The information to be printed is displayed on the screen 15 so that it can be checked for accuracy.

In simplified operation of the apparatus of the present invention, a check 13 is inserted by the operator into a check guide 14, which extends laterally across the width of the apparatus. In the embodiment shown, the check may be inserted into the check guide 14 either laterally from the left side as shown in solid lines or it may be inserted into the check guide 14 vertically from above, as shown in phantom lines. After insertion, the check 13 is first sensed to determine that it is in proper position in the check guide, and then is moved to a base position and from there past the print font where the information entered by the operator at the keyboard is encoded onto the check. The check is then ejected from the apparatus. The transaction printed on the check is also printed out in hard copy by means of a printer 20.

Figure 4:
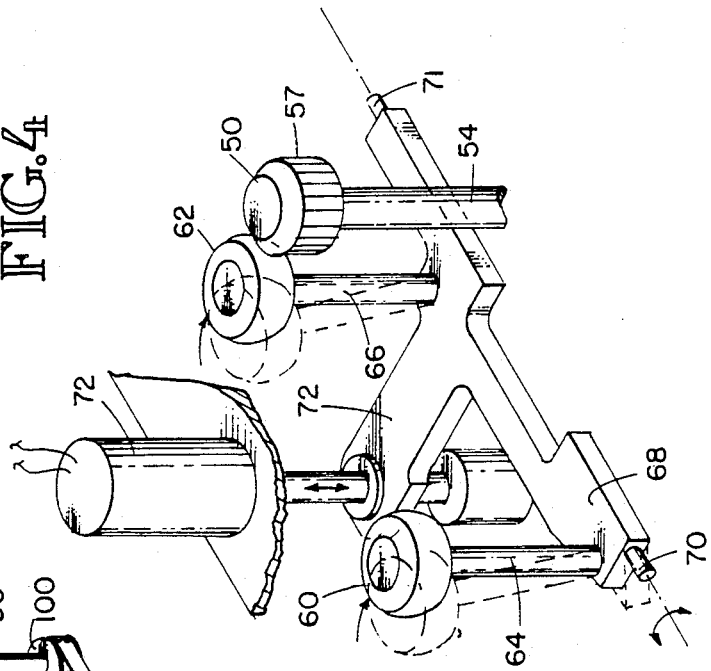
FIG. 4 is an isometric view of the check clamping portion of the paper transport system shown in FIG. 3.
Figure 3:
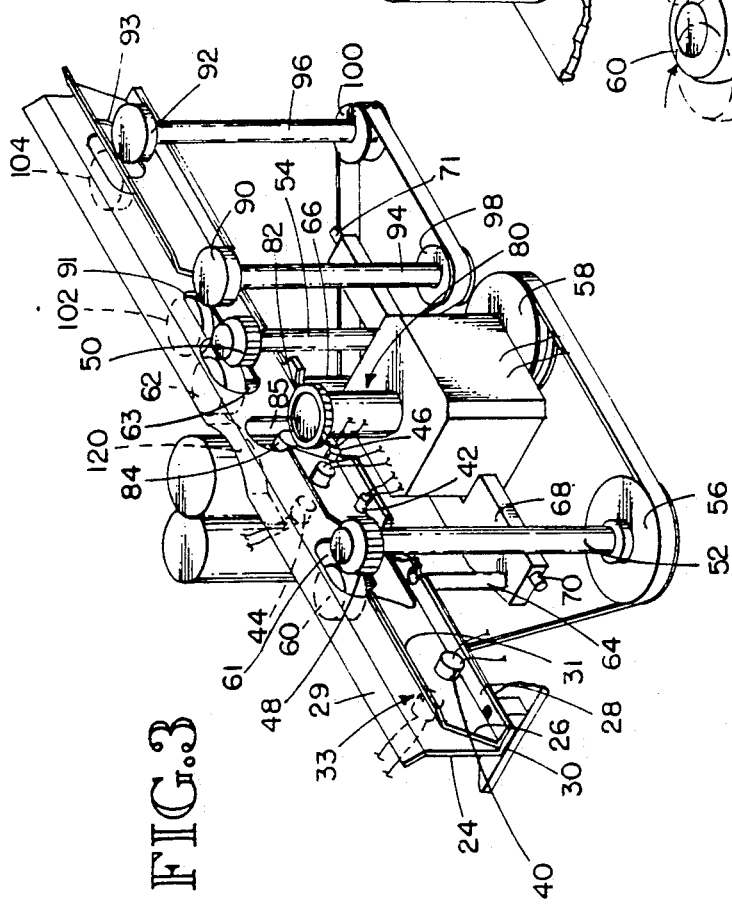
FIG. 3 is an isometric view of the paper transport system of the apparatus of FIG. 1.

Referring now to FIGS. 3 and 4, there is shown in more detail the check guide 14 which comprises a rear section 24 and a forward section 26. The forward section includes a narrow horizontal flange 28 at the lower edge thereof, which is secured to a mating flange 30 at the lower edge of the rear section 24. The forward rear sections 24 and 26 are arranged and configured so that when they are secured together along their respective flanges 28, 30, a V-shaped trough 33 is defined between them. It is trough 33 which receives the check to be encoded. At the top of the trough the distance between the two sections 24 and 26 is approximately ⅛ inch, while at the bottom of the trough 33 the distance between sections 24 and 26 is 1/16 inch. At the top of sections 24 and 26, respectively, are upper flanges 29, 31 which angle outwardly from each section, defining an entry to check guide 14.

In the embodiment shown, the check guide 14 is made from clear plastic, approximately 1/16 inch thick. Positioned in check guide 14 are a plurality of sensors. Each sensor includes a conventional light emitting diode (LED) and an infrared sensor. The information provided by each sensor is provided to the microprocessor which in turn controls the function of the apparatus, as described in more detail below. Sensors 40 and 42 are positioned near the bottom of the check guide 14 and are responsible for ascertaining that the check has been properly seated in the check guide 14 and is in a selected position longitudinally of the check guide. Sensors 40 and 42 are in the same horizontal plane, and are separated in the embodiment shown by a distance of approximately 2⅛ inches. When both sensors 40 and 42 are covered, i.e. when the check fully interrupts the light path between the two elements (LED, sensor) of each sensor, the check is clamped, as described in detail hereinafter, and then transported along the check guide for printing.

Sensor 44 is positioned a relatively small distance (⅝ inch) up from and slightly forwardly of sensor 42. Sensor 44 detects the leading edge of the check, which, along with information from sensors 40 and 42, results in the complete recognition of the position of the check prior to the encoding thereof. Positioned in substantially the same horizontal plane as sensors 40 and 42, but slightly forwardly (¼ inch) of sensor 44, is sensor 46. When the check is properly positioned, as recognized by sensors 40, 42 and 44, sensor 46 provides information for the determination of the presence of a complete lower front corner for the check. This is referred to as a "dog ear" sensor, i.e., it detects the presence of a dog ear or tear in the lower corner of the leading edge of the check.

The check clamping mechanism is also shown in FIGS. 3 and 4. It includes two fixed drive wheels 48 and 50 in the embodiment shown. The forward section 26 of the check guide 14 is cut out to accommodate the fixed drive wheels 48, 50. The fixed drive wheels 48, 50, respectively, are mounted on vertical drive shafts 52 and 54. At the bottom of the vertical shafts 52, 54 are pulley wheels 56 and 58, respectively. The fixed drive wheels 48 and 50 in the embodiment shown are metal, have a total height of approximately 0.6 inches, including knurled vertical surface portions 55, 57 of approximately 0.35 inches. The top and bottom edges of the fixed drive wheels are relieved.

Two drive rollers 60 and 62, which are positioned in the same lateral plane relative to check guide 14 as drive wheels 48 and 50, extend through corresponding cut out portions 61, 63 in the rear section 24 of check guide 14. Drive rollers 60 and 62 are polyurethane and are rounded as shown most clearly in FIG. 4. In the embodiment shown, drive rollers 60 and 62 are mounted on vertical drive shafts 64 and 66, respectively. Drive shafts 64 and 66 are in turn mounted on a horizontal support plate 68. Support plate 68 is supported for pivoting movement in a vertical plane about horizontal pins 70, 71 which extend into the side edges of plate 68, in the vicinity of the front edge of plate 68. Plate 68 includes a rear section 72 which moves vertically under the control of a solenoid 72. Actuation of the solenoid 72 rotates the plate 68 upwardly about pins 70 and 71 which in turn results in the movement of drive rollers 60 and 62 toward drive wheels 48 and 50.

In one operating position in which the solenoid 72 is not actuated, the drive rollers 60 and 62 are out of physical contact with drive wheels 48 and 50. In the other operating position, in which the solenoid 72 is actuated, the drive rollers 60 and 62 move into close proximity to the drive wheels 48 and 50, thereby firmly gripping and clamping the check which is positioned between them.

Referring now to FIG. 5, the check is moved in the check guide 14 by rotation of the drive wheels 48, 50. This is accomplished by a motor 76, which through a first drive belt 78 drives both pulley wheels 56 and 58, which in turn results in the rotation of drive shafts 52 and 54 and drive wheels 48 and 50, thereby moving the check in a selected direction. In the embodiment shown, motor 76 is a two-way motor, so that the check can be moved in both directions in the guide means by means of the motor 76 and the drive wheels 48 and 50. In a specific embodiment, the motor 76 is a stepper motor to permit precise control over the position of the motor.

The check is encoded by means of a print mechanism shown generally at 80 in FIG. 3 which includes a rotating print font 82 having the characters to be printed, and an impact hammer 84 which moves through a cut out portion 85 in the rear section 24 of the check guide 14 as the check moves between the hammer 84 and the print font 82.

Positioned downstream of the check drive system, i.e. to the right of the print station 80 and the drive wheel 50/drive roller 62 combination in FIG. 3, is a check eject system. In the embodiment shown, the check eject system includes a pair of spaced eject wheels with associated eject rollers. Eject wheels 90 and 92 are fixed in position and extend through corresponding cut out portions 91, 93 in the forward section 26 of the check guide 14. Eject wheels 90 and 92 in the embodiment shown are metal with a relatively soft plastic rim, i.e. polyurethane, and are supported by vertical drive shafts 94 and 96. At the lower end of drive shafts 94 and 96 are pulley wheels 98 and 100. In the embodiment shown, the eject wheels 90 and 92 are separated by a distance of 3 inches between their respective centerlines.

Eject rollers 102, 104, which work in combination with eject wheels 90 and 92, are also fixed in position and extend through openings 106, 108 in the rear section 24 of the guide 14 such that they are sufficiently close to the eject wheels 90 and 92 that a check is gripped therebetween and is moved when the eject wheels are rotated, absent any other force on the check. However, during the time that the check is clamped between the drive wheels 48, 50 and drive rollers 60 and 62, the gripping action of the eject system is insufficient to affect the movement of the check by action of the eject wheels. This permits the eject wheels to be moving continuously during the check encoding process without affecting the movement of the check until drive rollers 60, 62 are unclamped. Referring to FIG. 5, the eject drive wheels 90 and 92 are also driven by motor 76, through a second drive belt 102. The second drive belt 102 extends around drive pulleys 98 and 100 as shown and an idler wheel 104. Hence, the check eject system is driven independently of the check drive system, but by the same motor.

When the encoding of the check is completed and the check is at a position where at least the first eject wheel/roller combination is in contact with the check, the check is unclamped by releasing the solenoid 72. The drive rollers 60 and 62 move away from contact with the drive wheels 48, 50, and the check is no longer gripped between them. Since at this point, however, the check has been moved far enough along the check guide that the front end of the check is gripped between eject wheel 90 and associated eject roller 102 and since eject wheel 90 is being continuously positively driven by motor 76, the check is moved further along check guide 14. The check soon has been moved sufficiently that it is gripped by both eject wheels and their associated eject rollers. The check is then rapidly moved along the remainder of the check guide and ejected from the apparatus to a bin or the like.

When the check is moved through the check guide, the high speed of the check typically causes the check to move back and forth rapidly within the guide, an undesirable effect referred to generally as "flapping". This effect typically cannot be alleviated by merely narrowing the angle of the check guide, as this typically increases significantly the possibility of paper jams. In order to prevent the flapping action, an element referred to as a check deflector has been provided in the embodiment shown. The check deflector, shown generally at 120 in FIG. 3 and in more detail in FIG. 6, comprises a strip of flexible plastic material which is secured to the front surface of the upper flange 29 of the rear section 24 of the check guide 14 in the vicinity of the print station.

The deflector 120 in the embodiment shown is approximately 2 mills thick and approximately 0.28 inches wide and 2.68 inches long. The end portions 122, 124 of the strip are rectangular while the middle portion 126 of the strip curves slightly downwardly. The upper edge 128 of the middle portion 126 has a radius of 1.125 inches, while the lower edge 130 has a radius of 1.75 inches. The lower edge of the end portions 122, 124 are generally coincident with the boundary between flange 29 and rear section 24 of the check guide, while the middle portion 126 extends into the check guide trough in the general direction of the front section 26 of the check guide approximately 1/16 inch, thereby narrowing slightly the width of the trough at that particular point.

During the time that the apparatus is encoding information onto the check, it is also providing a hard copy of that particular transaction. In the embodiment shown, the information to be printed on a given check, i.e. a single transaction, which is determined by the operator via the keyboard, is applied to a buffer memory 110 associated with the printer 20. The buffer memory 110 provides temporary storage for the information of each successive transaction, prior to actual printing thereof, so that checks can be encoded as rapidly and continuously as possible without regard to the actual speed of the printer. The printer 20 will catch up with the data in its buffer when there is a lull in the check encoding process. Such an arrangement makes the check encoding process independent of the hard copy transaction listing provided by printer 20, thereby increasing the overall speed of the check encoding process.

In the use of the apparatus, as briefly explained above, the check is first inserted into the check guide 14 by the operator, either from above or from the left side. When sensors 40 and 42 are completely covered, the check is then clamped between drive wheels 48 and 50 and associated drive rollers 60 and 62. If a dog ear is detected, the check is ejected or encoding prevented until the check is removed. Depending on the position of the check in the guide, a complete check (a check without a tear or dog ear) is either moved to the left, away from the print station, if the sensor 44 is initially covered, or to the right, toward the print station, if the sensor 44 is initially uncovered. When the leading edge of the check has been detected, the position of the check is fully known. This is referred to as the base position of the check. In the embodiment shown, the base position of the check is slightly to the left of the print station in FIG. 3, although still in the immediate vicinity thereof so as to minimize paper jams and the like due to excessive travel of the check along a check guide.

The check is then moved further along the check guide by the drive system and encoded with the information provided by the operator through the keyboard 12. Following complete encoding of the check, the clamp of the drive system is released, and the check is ejected from the check guide by the action of the eject system.

Accordingly, an improved electronic, programmable MICR encoder has been described, which incorporates a number of specific improvements to substantially increase the check processing speed.

Although a preferred embodiment of the invention has been disclosed herein for illustration, it should be understood that various changes, modifications and substitutions may be incorporated in such embodiment without departing from the spirit of the invention as defined by the claims which follow.

I claim:

1. A portable apparatus for automatically encoding MICR characters on a check or other document, comprising:

guide means capable of receiving a check or other document to be encoded;

means including first and second spaced apart sensors for detecting when the check is correctly positioned in the check guide means;

means for selectively clamping the check when both the first and second sensors detect the presence of a check and for thereafter moving the check along the check guide means;

means for encoding the check with selected data;

means located in the vicinity just prior to the encoding means for detecting the leading edge of the check and thereby locating the check in a base position, prior to encoding, in which base position the leading edge of the check is positioned before encoding means along the check guide means;

means for ejecting the check form the check guide means, said eject means located downstream of said encoder means and including means for gripping and moving the check, wherein the eject means is operative on the check while the check is clamped by the check clamping and moving means, the action of the eject means being insufficient, however, the to overcome the control of the movement of the check by the check clamping and moving means as long as said clamping and moving means is operative on the check; and means for releasing the clamping means from the check when encoding has been completed and the eject means is operative on the check, thereby permitting the eject means to move the check rapidly out of said guide means and said apparatus.

2. An apparatus of claim 1, wherein said guide means is adapted to receive a check either from above the guide or from one side thereof.

3. An apparatus of claim 1, including sensor means for detecting the presence of a complete lower leading edge of the check.

4. An apparatus of claim 1, wherein the check clamping and moving means includes first and second spaced apart drive wheels and associated first and second spaced apart drive rollers, said drive rollers being supported for movement between two positions, wherein in a first position of the drive rollers the check is securely clamped between the drive wheels and the drive rollers, and in a second position of the drive rollers the check is not clamped between the drive wheels and the drive rollers, wherein the check clamping and moving means further includes means for driving the drive wheels to move the check when the drive rollers are in said first position and means for moving the drive rollers between said first and second positions.

5. An apparatus of claim 1, wherein the eject means includes first and second spaced apart eject wheels, associated first and second spaced apart eject rollers, and motor means for driving the eject wheels, the eject wheels and eject rollers being respectively positioned so that the check is gripped between them as long as the check is actually positioned between them, wherein the eject wheels are driven continuously from the time that the check is clamped by the check clamping and moving means.

6. An apparatus of claim 5, wherein the eject wheels are driven independently of the clamping and moving means by said motor means and wherein the means for driving the eject wheels includes driving elements for said eject wheels, an idler wheel and a drive belt connecting the motor, the driving elements and the idler wheel.

7. An apparatus of claim 1, including means for separately recording the data encoded on each check and buffer memory means for temporarily storing said data prior to recording thereof, thereby preventing any delays in encoding of checks by the apparatus.

8. An apparatus of claim 1, including a relatively flat, thin check deflector means positioned in the guide means in the vicinity of the check encoder means, said check deflector means mounted on a rear section of the guide means and configured to extend at all times slightly inwardly into the guide means, thereby slightly narrowing the guide means at that point.

* * * * *

UNITED STATES PATENT AND TRADEMARK OFFICE
CERTIFICATE OF CORRECTION

PATENT NO. : 4,991,983

DATED : February 12, 1991

INVENTOR(S) : James M. Graverholt

It is certified that error appears in the above-identified patent and that said Letters Patent is hereby corrected as shown below:

COLUMN 6:

Claim 1, line 19, the word --the-- should appear before the word "encoding";

Claim 1, line 20, the word "form" should be --from--;

Claim 1, line 27, the word --the-- between the words "ever," and "to" should be eliminated.

Signed and Sealed this

Eighth Day of September, 1992

Attest:

DOUGLAS B. COMER

*Attesting Officer*  *Acting Commissioner of Patents and Trademarks*